United States Patent
Cummings et al.

(10) Patent No.: US 10,025,039 B1
(45) Date of Patent: Jul. 17, 2018

(54) OPTICAL FIBER POLARITY TESTER

(71) Applicant: Kevin M. Ehringer Inc., Dallas, TX (US)

(72) Inventors: Troy D. Cummings, Mesquite, TX (US); Tung Pham, Dallas, TX (US); Kevin M. Ehringer, Dallas, TX (US); Billie Cottongim, Plano, TX (US)

(73) Assignee: Kevin M. Ehringer Inc., Dallas, TX (US)

( * ) Notice: Subject to any disclaimer, the term of this patent is extended or adjusted under 35 U.S.C. 154(b) by 0 days.

(21) Appl. No.: 15/407,760

(22) Filed: Jan. 17, 2017

(51) Int. Cl.
*G01N 21/00* (2006.01)
*G02B 6/38* (2006.01)
*G01M 11/08* (2006.01)

(52) U.S. Cl.
CPC ........... *G02B 6/385* (2013.01); *G01M 11/088* (2013.01)

(58) Field of Classification Search
CPC .............................. G01M 11/088; G02B 6/385
USPC ........................................................ 356/73.1
See application file for complete search history.

(56) References Cited

U.S. PATENT DOCUMENTS

| | | | |
|---|---|---|---|
| 3,328,684 A | 6/1967 | Dorris | |
| 4,280,765 A * | 7/1981 | Pophillat | G01M 11/333 356/73.1 |
| 8,670,110 B2 | 3/2014 | Schillab et al. | |
| 8,692,984 B2 | 4/2014 | Schell et al. | |
| 9,435,713 B2 | 9/2016 | Collier et al. | |
| 2013/0194566 A1 * | 8/2013 | Schell | G01M 11/3136 356/73.1 |
| 2016/0041065 A1 | 2/2016 | L'Heureux et al. | |
| 2016/0100234 A1 | 4/2016 | Adhikesavalu et al. | |
| 2016/0349145 A1 | 12/2016 | Irving | |

FOREIGN PATENT DOCUMENTS

EP 2623948 A1 8/2013

OTHER PUBLICATIONS

International Search Reporting and Written Opinion for Application No. PCT/US2018/013323, dated Apr. 30, 2018, 8 pgs.

* cited by examiner

*Primary Examiner* — Sunghee Y Gray
(74) *Attorney, Agent, or Firm* — Haynes and Boone, LLP

(57) ABSTRACT

The present disclosure includes systems and methods for testing bundles of fiber optic fibers, such as fiber optic trunk cables, for correct polarity of connections at each end of the bundle of fibers while preventing the fiber optic fibers from contacting any other components during testing. The systems include a processor, a plurality of signal generators interfaced with a plurality of signal generator ports, a sensor interfaced with a sensor input port, a first selector switch, and a display, the processor operable to stimulate the plurality of signal generators one at a time in a first sequence to produce a signal, the first sequence based on a position of the first selector switch, the processor further operable to cause the display to display an output of the sensor.

20 Claims, 9 Drawing Sheets

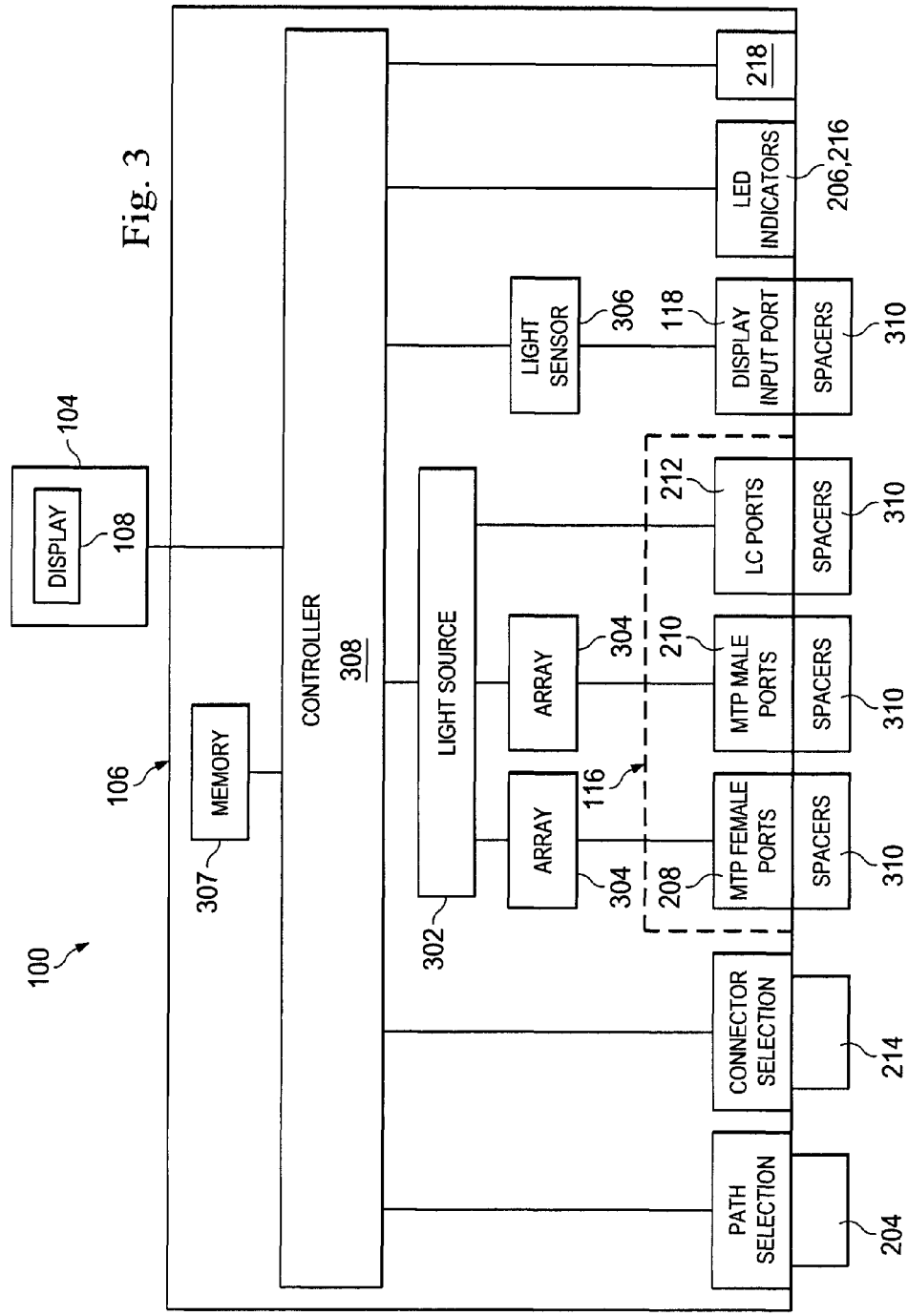

OPTICAL FIBER POLARITY TESTER

TECHNICAL FIELD

The present description relates, in general, to systems and techniques for polarity testing of fiber optic cables.

BACKGROUND

Fiber-optic communications allow for optical transmission of information with various advantages over electrical transmission via copper wires. For example, fiber optic cables may allow very high bandwidth transmissions with very low loss compared to copper wire. In various applications, optical fibers may be bundled together into transmit-receive pairs, and multiple transmit-receive pairs may be bundled together to create a multi-channel cable. It may be desirable, therefore, to confirm that each output of a multi-channel cable corresponds to the correct input of the multi-channel cable.

SUMMARY

In some exemplary aspects, the present disclosure is directed to an apparatus for testing a polarity of a fiber optic cable. The apparatus may include a plurality of signal generator ports configured to connect to a first end of a fiber optic cable, a plurality of test signal generators disposed to cooperate with the plurality of signal generator ports, and a sensor input port configured to connect to a second end of a fiber optic cable. The apparatus may also include a sensor disposed to cooperate with the sensor input port and configured to receive a test signal from the sensor input port. A first selector switch may be operable by a user to select a test sequence of a plurality of different test sequences. A processor may be operable to stimulate the plurality of test signal generators to produce a test signal in a first sequence based on the selected test sequence. The processor may be further operable to output results of the test sequence to a user.

In some aspects, the apparatus may include a display in communication with the processor and arranged to receive the results output from the processor and display the results to the user. In some aspects, the results output from the processor to the display is a second sequence different from the first sequence, and the second sequence is the same for any of the plurality of different test sequences. In some aspects, the results output from the processor to a display indicate that the sensor sensed the signal in an expected sequence related to the first sequence. In some aspects, the expected sequence is a function of a cable through which the signal is passed. In some aspects, the sensor is a light sensor, and the signal generator is a light source. In some aspects, the sensor is a camera, and the output of a display represents the output of the camera. In some aspects, the first selector switch selects from one of five transmission protocols, and the first sequence is based on the selected one of the five transmission protocols. In some aspects, the apparatus may include a second selector switch, and wherein: the signal generator ports are comprised of multi-termination push-on (MTP) female connectors, MTP male connectors, and lucent connectors (LC), the sensor input port is an MTP female connector, and a position of the second selector switch selects one of the MTP female connectors, the MTP male connectors, or the LC to be stimulated. In some aspects, the sensor input port and the signal generator ports include guide pins that space the sensor input port and the signal generator ports away from ferrules of optical fibers connected to the sensor input port and the signal generator ports such that the sensor input port and the signal generator ports are in optical communication with the optical fibers. In some aspects, the apparatus may include a memory containing a plurality of pre-determined first sequences, the processor further operable to retrieve the pre-determined first sequences based on a position setting of the first selector switch. In some aspects, the processor is further operable to create the first sequence based on a position setting of the first selector switch.

In some exemplary aspects, the present disclosure is directed to a method that may include illuminating a plurality of light sources one at a time in a first sequence so that light travels into a first end of a corresponding plurality of optical fibers in the first sequence; receiving the light from a second end of the plurality of optical fibers at a light sensor; and displaying an output from the light sensor in a second sequence different from the first sequence.

In some aspects, the first sequence is selected so that light received from the second end of the plurality of optical fibers sequentially emits from fibers adjacently disposed in a row. In some aspects, the first sequence is selected from a plurality of pre-determined first sequences based on a position of a selector switch. In some aspects, the first sequence is created based on a position of a selector switch. In some aspects, the light sources are light emitting diodes (LEDs).

In some exemplary aspects, the present disclosure is directed to a method that may include selecting a pre-determined stimulation sequence from a plurality of pre-determined stimulation sequences stored in a fiber-optic polarity tester; and projecting light sequentially through a first end of a plurality of optical fibers based on the pre-determined stimulation sequence, the pre-determined stimulation sequence being selected so that light emitted from a second end of the plurality of optical fibers emits from fibers adjacently aligned in a row; and displaying a response sequence on a display corresponding to the light emitted from the second end of the plurality of optical fibers to determine, based on an observed response sequence, whether there is a defect in a fiber optic cable through which the stimulation sequence traveled.

In some aspects, the selecting the pre-determined stimulation sequence is based on a polarity configuration of the fiber optic cable. In some aspects, the light emitted from the second end of the plurality of optical fibers emits from fibers adjacently aligned in a row for each of the plurality of pre-determined stimulation sequences.

BRIEF DESCRIPTION OF THE DRAWINGS

FIG. 3 is an illustration of an internal diagram of an example implementation of the multi-path polarity tester.

DETAILED DESCRIPTION

Figure 1:
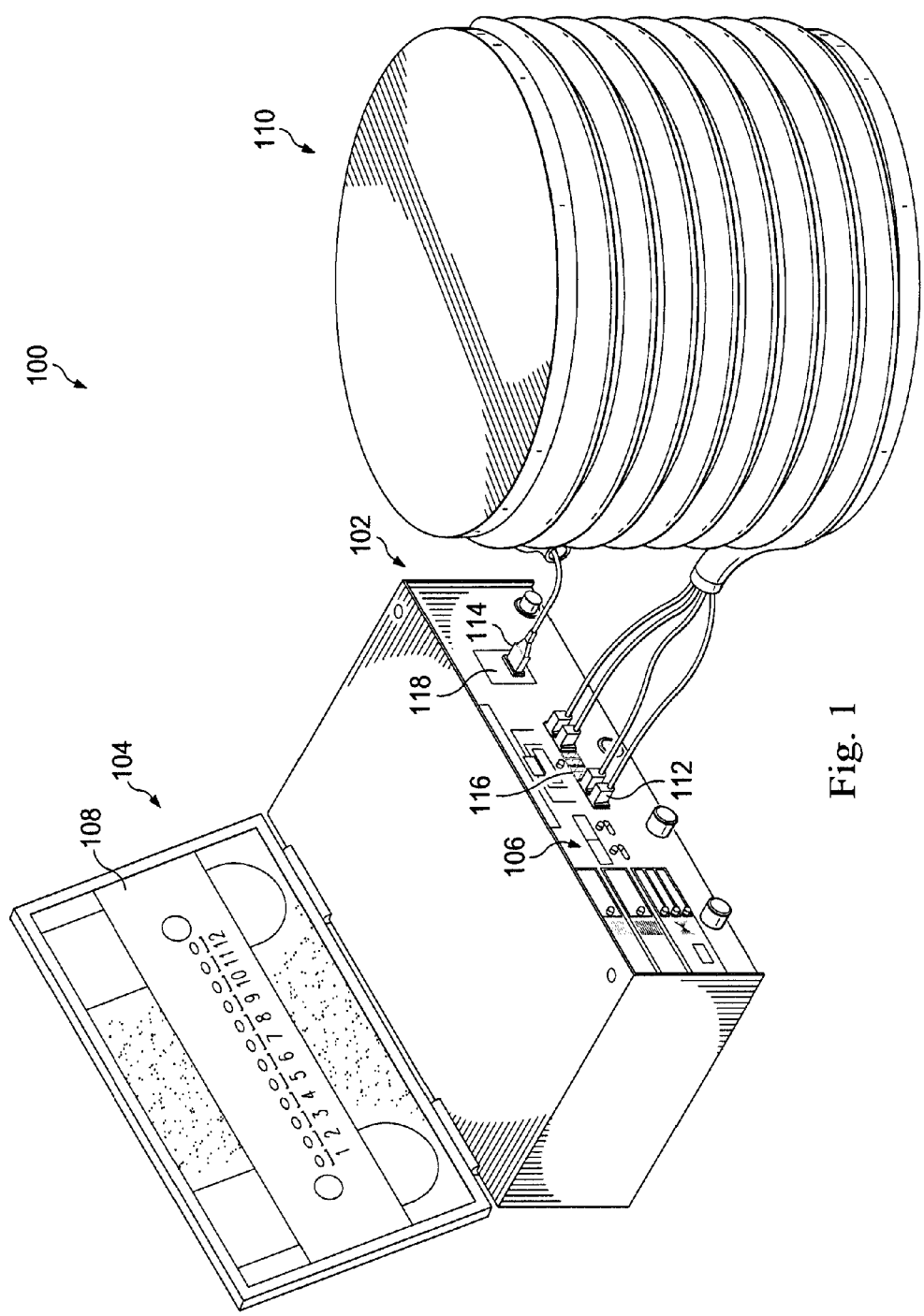
FIG. 1 is an illustration of a multi-path polarity tester according to an example implementation of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

Data centers and network facilities use multi-fiber optical cables, which may be called trunk cables, to carry data in the form of light from one end of the cable to the other via each fiber of the cables. Using light as the medium for transmission may provide various benefits over use of electrical transmission over copper wires. For example, light transmissions over fiber optic cables offer higher bandwidth, faster transmissions, and less transmission loss over long distances than electrical transmissions over copper wire. Light transmissions are also immune to much of the environmental interference that affects electric current over copper wires.

In many applications, for each fiber in a trunk cable that transmits data in one direction, there is a paired fiber that carries data in the opposite direction, forming a transmit-receive pair which may be called a channel. When fiber optic trunk cables are manufactured, they may be manufactured with one of a variety of polarity configurations, which may also be referred to as transmission polarities or transmission protocols. It is important that data sent over a fiber arrives at the expected location on the other end, which is to say that it is important that the trunk cable be manufactured with the expected polarity configuration. A trunk cable with an incorrect polarity configuration will cause miscommunication between pieces of equipment that are trying to communicate over the cable. Such miscommunications can be costly to locate, both in terms of down time of the equipment and user time spent troubleshooting.

Accordingly, it is desirable to do quality assurance testing on newly manufactured fiber optic trunk cables to ensure that the polarity configuration is correct. This typically involves applying a stimulus to one end of the cable and observing the response at the other end of the cable. The tester, knowing what the polarity configuration of the cable is supposed to be, knows what the response should look like for a given stimulus and can therefore evaluate the polarity configuration based on observing the response, such as visually observing the response. The stimulus may simply be a light source shined down each fiber in the bundle, one fiber at a time, in a known sequence. Evaluation may be performed simply by looking at the other end of the cable with the naked eye to observe the response. Alternatively, a camera, magnifier, or other apparatus may be used to assist the user in observing the response more easily, as optical fibers tend to be very small in diameter.

There are different expected responses to the same stimulus for different polarity configurations. As a result, a tester that is using the same stimulation sequence for each cable that is tested must mentally keep track of the proper expected response for each cable that is tested. While not intrinsically difficult, human error can easily occur when a tester spends many hours testing cable after cable with changing expected response sequences. Furthermore, some response sequences may be inherently simpler to keep track of than others (e.g., the linear sequence 1, 2, 3, 4, 5, 6, 7, 8, 9, 10, 11, 12 may be easier to keep track of than the sequence 2, 1, 4, 3, 6, 5, 8, 7, 10, 9, 12, 11). The potential for human error would be reduced if the tester only had to keep track of one response sequence for all stimulation sequences. This may be accomplished, for example, by allowing a processor to keep track of the polarity configuration of the cable under test, to modify the stimulation sequence to ensure that the expected response is the same for each possible polarity configuration, and to apply the modified stimulation sequence to an end of the cable under test.

The present disclosure describes systems and methods for testing bundles of optic fibers, such as fiber optic trunk cables, for correct polarity of connections at each end of the bundle of fibers. Ends of each fiber in the cable may be placed into a connector to simplify connection of the cable to the input and output equipment. The same stimulation to the input connectors will give different response sequences at the output connector. For example, if there are 12 fibers in a cable, and the input connector fibers are stimulated in order from 1 through 12, the output response should match the sequence of the polarity transmission protocol of the trunk cable. However, manufacturing defects may result in an unexpected result, which is to say that fibers may not be correctly connected to either the input connector or the output connector. This may be tested for by applying a known stimulation sequence and observing the response to see if it is as expected. If the response is not as expected, the user can conclude that the cable is flawed.

In some implementations of the present disclosure, a user may connect both the input and output of a 12-fiber trunk cable to a multi-path, fiber-optic polarity tester and select a polarity configuration on the tester that corresponds to the intended polarity configuration of the cable. The user may then initiate a test. A processor or controller in the polarity tester may modify a stimulation sequence based on the selected polarity configuration such that the expected response is a linear response (e.g., each fiber of the output lights up in order from position 1 to position 12). In some implementations, this modification may comprise selecting one of a number of pre-determined stimulation sequences from a memory. The user may then view the response at the output of the cable, for example using a magnifying device or a display device that displays an output of a camera viewing the cable's output to verify that the expected liner response occurs. In this way, a user of the polarity tester may ensure the polarity tester is set up correctly and then may watch for one response sequence. In other implementations, the response sequence may be any sequence that is desired, or the polarity tester may perform image analysis of the camera output and make its own determination of whether the expected response sequence was seen.

Referring now to FIG. 1, there is illustrated a multi-path polarity tester 100 according to an implementation of the present disclosure. In this implementation, the multi-path polarity tester 100 includes a base unit 102 and a display unit 104. The base unit 102 includes a front panel 106, further described in FIG. 2, which may contain various ports, indicators, and controls, including input or user interface components. The base unit 102 may further contain a processor, memory, sensors, test signal generators, and the like as well as any associated circuitry. In an implementation, the test signal generators may be Light Emitting Diodes (LEDs), and the sensor may be a camera. The display unit 104 contains a display 108, which may be, for example, a liquid crystal display (LCD), a thin-film-transistor (TFT) LCD, an organic light emitting diode (OLED) display, or the like. In other implementations, the display 108 may be a tablet computer, a smart phone, or the like. A fiber optic trunk cable 110 may connect to the polarity tester 100 by interfacing connectors on the ends of the trunk cable 110 with ports of the front panel 106. For example, an input connector 112 of the first end of the trunk cable 110 may connect to a signal generator output port 116 of the front panel 106, and an output connector 114 of the second end of the trunk cable 110 may connect to a sensor input port 118 of the front panel 106.

Figure 2:
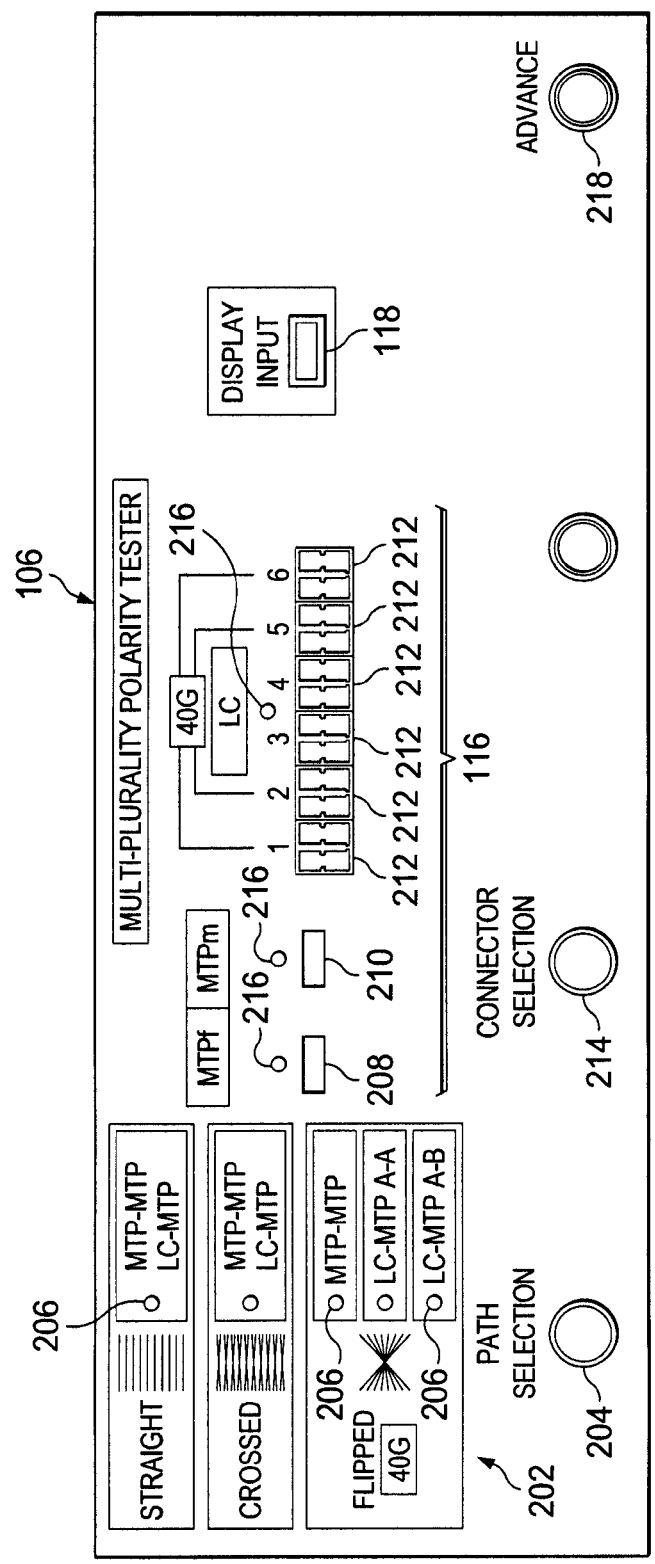
FIG. 2 is an illustration of an implementation of the front panel of the multi-path polarity tester.

Referring now to FIG. 2, there is illustrated an implementation of the front panel 106 of the multi-path polarity tester 100. A path selection portion 202 has a path selection control 204 that allows for selection of a transmission protocol, or transmission path, for the polarity tester 100. The possible transmission protocols will be described in further detail below with respect to FIG. 3. In this implementation, the path selection control 204 may be a knob. In other implementations, the path selection control 204 may be some other type of input device, including for example, a switch, toggle, button, selectable icon on a computer screen, or other user input device. The path selection portion 202 may further include path selection indicators 206, which may be LEDs or the like. As the path selection control 204 is manipulated, a path selection indicator 206 corresponding to the currently selected transmission protocol, or path, will activate. For example, if the path selection indicator is an LED, it may light up. Labels associated with the each selection indicator 206 may be referenced by a user of the polarity tester 100 to determine which transmission protocol is presently selected before initiating a test.

The input connectors 112 of the trunk cable 110 (FIG. 1) may use various industry standard connector types. For example, the Multi-Termination Push-on (MTP) or Multifiber Push-on (MPO) is a compact, single connector that houses all of the fibers in the trunk cable 110. In the present implementation, a 12-fiber MTP connector is used as the input connector 112 of trunk cable 110, but standard 24-fiber, 72-fiber, or larger MTP connectors may also be used. The MTP connector comes in a male (MTPm) and female (MTPf) variety. The MTPm connector includes guide pins which slot into holes in an MTPf connector in order to align the fibers of the connector with corresponding fibers in the female connector. Lucent Connectors (LCs) house a single fiber, by contrast. LCs may be clipped together to ensure that the fibers maintain a desired spatial relationship to each other. In the present implementation, 12 LCs, representing 6 channels, are clipped together to serve as an integral 12-fiber input connector 112 for trunk cable 110.

In an implementation of the present disclosure, the signal generator output ports 116 of the front panel 106 include an MTPf signal generator output port 208, an MTPm signal generator output port 210, and six LC pair signal generator output ports 212, each of which include two LC output ports. These various output ports 116 allow the front panel 106 to interface with trunk cables 110 using MTPf, MTPm, and LC connectors. The front panel 106 has a connector selection control 214 that allows for selection of an active signal generator output port set from among the MTPf signal generator output port 208, the MTPm signal generator output port 210, and the LC pair signal generator output ports 212. As the connector selection control 214 is manipulated, an active connector indicator 216 associated with each set of output ports will activate to indicate to a user of the polarity tester 100 which ports are presently selected, and therefore which ports to plug the trunk cable 110's input connectors 112 into for testing. The active connector indicators 216 may be, for example, LEDs that light up when activated.

The front panel 106 further includes a sensor input port 118 that interfaces with the output connector 114 of the trunk cable 110. In the present implementation, the sensor input port 118 is an MTP port. Accordingly, the system disclosed herein can test MTP-MTP and/or MTP-LC cable assemblies.

The front panel 106 further includes a test initiation control 218. In this implementation, the test initiation control 218 may be a button that may be pressed to initiate a test sequence. In other implementations, the test initiation control 218 may be some other type of input device, including for example, a switch, toggle, selectable icon on a computer screen, or other user input device. When the test initiation control 218 is actuated, the polarity tester 100 will initiate a polarity test, as further described below.

Referring now to FIG. 3, there is illustrated an internal diagram of an implementation of the multi-path polarity tester 100. The base unit 102 includes a light source 302 that serves as a signal generator for the polarity tester 100. The light source may be comprised of, for example, visible light LEDs and supporting circuitry. The light source 302 is connected to the MTPf signal generator output port 208, the MTPm signal generator output port 210, and the LC pair signal generator output ports 212 in order to provide light to the input connectors 112 of the trunk cable 110.

As each LC pair port 212 corresponds to a pair of fibers in the trunk cable 110, it is possible to simply align an LED behind each LC pair port 212. However, the MTP ports 208 and 210 may be too compactly configured to align an LED with each fiber of the cable. Accordingly, arrays 304 may be used to direct light from LEDs of light source 302 to the points of the MTP ports 208 and 210 meant to interface with fibers in an MTP input connector 112. The arrays 304 may include short optical fibers that serve to redirect light from LEDs of light source 302 on one end to openings of MTP ports 208 and 210 on a second end. In some implementations, similar arrays may be used for the LC pair ports 212 to allow for freedom of placement of the light source 302 within the base unit 102. In some examples, four of the LC pair ports 212 (referenced also as ports 1, 2, 5, 6) would be used only when a 4-channel cable is tested. For example, four ports 212 may be used when testing a 40 Gig LC-MTP A-A or LC-MTP A-B (40 Gig assemblies only 4 channels 1,2/5,6). In some examples, all six LC pair ports 212 may be for any six channel configuration. That is, all six LC ports 212 may be used when six LCs are required for any 6 channel LC-MTP cable assembly with any of the path configurations.

The base unit 102 further includes a light sensor 306 configured to receive light from the sensor input port 118. In an implementation, the light sensor 306 may be a camera, a digital microscope, or the like. The light sensor may be located and oriented to provide a visualization of the input ports so that they can be displayed on the display 108. In an implementation, the input to light sensor 306 is processed by processor 308, described below, and displayed by display unit 104, as described below with respect to FIG. 5.

The base unit 102 further includes a memory 307, which may include various instructions to be executed by the processor 308 as well as a number of pre-determined stimulation sequences that correspond to settings of the path selection control 204.

The base unit 102 further includes a controller or processor 308, which may be a microcontroller or the like. The processor 308 interfaces with the light source 302, light sensor 306, memory 307, path selection control 204, connector selection control 214, path selection indicators 206, active connector indicators 216, test initiation control 218, and display unit 104. The processor 308 may coordinate the functions of the above elements as will be further described below.

The base unit 102 further includes adapters 310, identified as spacers in FIG. 3, integrated with the signal generator output ports 116 and the sensor input port 118. The adapters interface with the input connectors 112 and output connector 114 of the trunk cable 110 to securely seat the connectors 112 and 114 into their respective ports in such a way that no part of the ports contacts the ferrules of connectors 112 and 114. This prevents wear and tear on the ferrules of connectors 112 and 114 while optically connecting the trunk cable 110 to the polarity tester 100 to perform diagnostic tests. This preservation of the ferrules can aid in prolonging the useful life of the connectors and avoids risk of damage during testing. Accordingly, because some implementations include ports that do not contact the ferrules of the connectors, the polarity tester described herein may be referred to as a non-contact polarity tester. In addition, the light sensor may visually capture light through the cable without any contact on the ferrule, and therefore there may be no risk of contact there at all.

The adapters of the MTPm and MTPf ports may be modified to be longer than those standardly used on MTPm or MTPf connectors in order to prevent contact with the ferrule of the corresponding MTPf or MTPm connectors while maintaining proper alignment. The MTPm connectors may include guide pins. The adapters of the LC ports may take the form of a sleeve that is designed to fit around the LC connector while spacing the ferrule of the LC connector away from the output ports 116 and maintaining proper alignment. Accordingly, in some implementations, the adapters of the output ports are modified to allow a gap between the light source port and the connector that is plugged therein to be tested.

Figure 8:
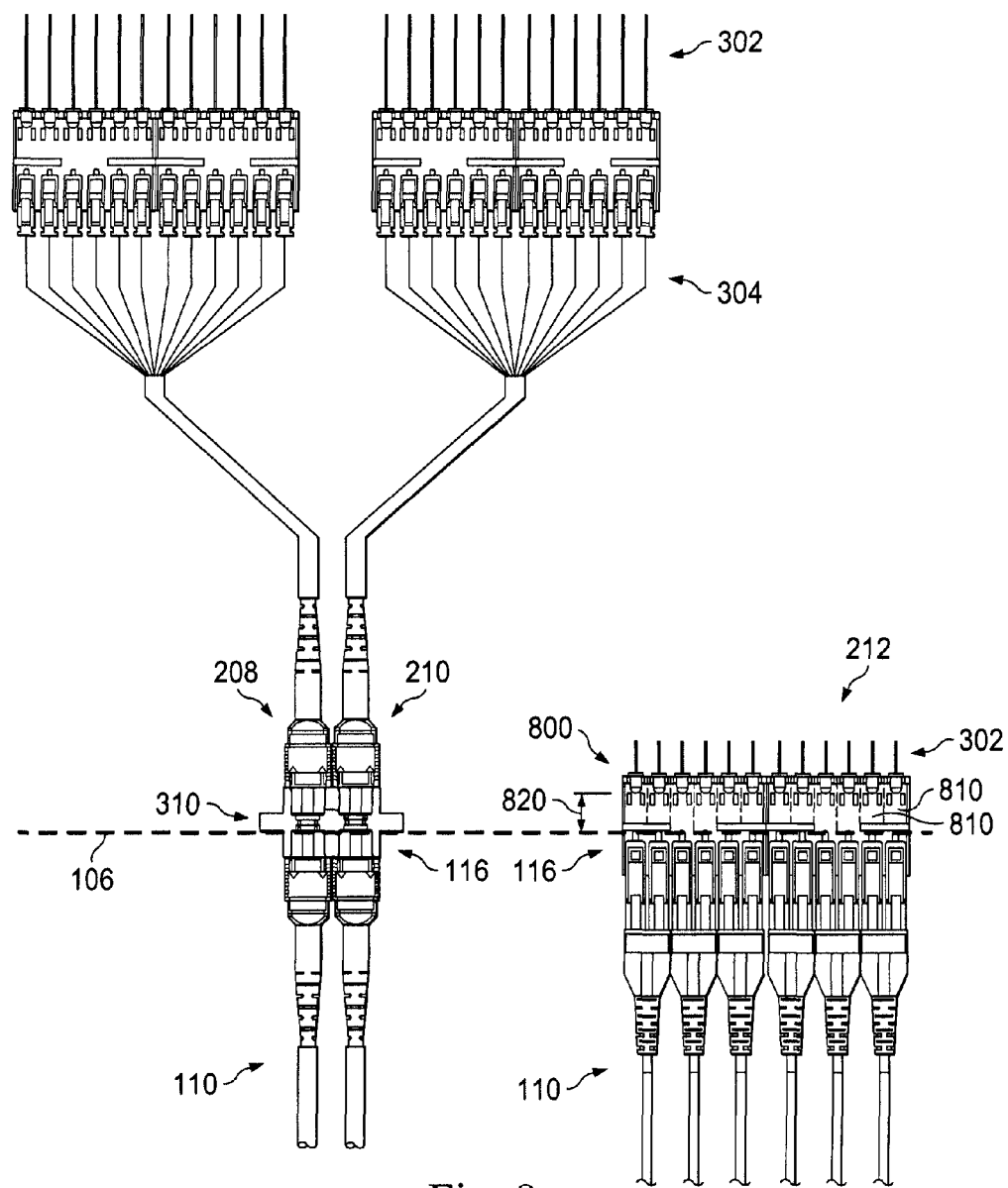
FIG. 8 is an illustration of a diagram of connectors relative to a light source in accordance with an exemplary implementation of the present disclosure having a non-contact space between the ends of the connectors and the light source.

FIG. 8 shows exemplary implementations of an adapter 800 for a lucent connector (LC) and an adapter 310 for MTP female and male connectors in greater detail with the adapters 800, 310 offsetting the trunk cable 110 to prevent the fibers of the cable 110 from contacting any surfaces of the testing ports 212, 208, 210. The LC adapter 800 houses light source 302 disposed adjacent tunnels 810 such that an individual light source 302 (e.g., an LED) provides light directed through an individual tunnel 810. Light passes through the tunnel 810 and into the ferrules of the LC. The LC adapter 800 also provides a gap 820 between the end of the LC and the light source 302 to prevent contact between the fibers of the LC and any components or surfaces of the LC adapter and the LC pair signal generator output ports 212. In some implementations, the gap 820 may be sized in the range of any non-contact gap to approximately 1.0 inch. In some implementations, the gap 820 may more preferably be 0.22 to 0.23 inch. However, other sizes of gap 820, both larger and smaller, are contemplated. The MTP adapter 310 may be used with arrays 304 to redirect light from LEDs of the light source 302 when the fibers of the trunk cable 110 are compactly configured.

Figure 9A:
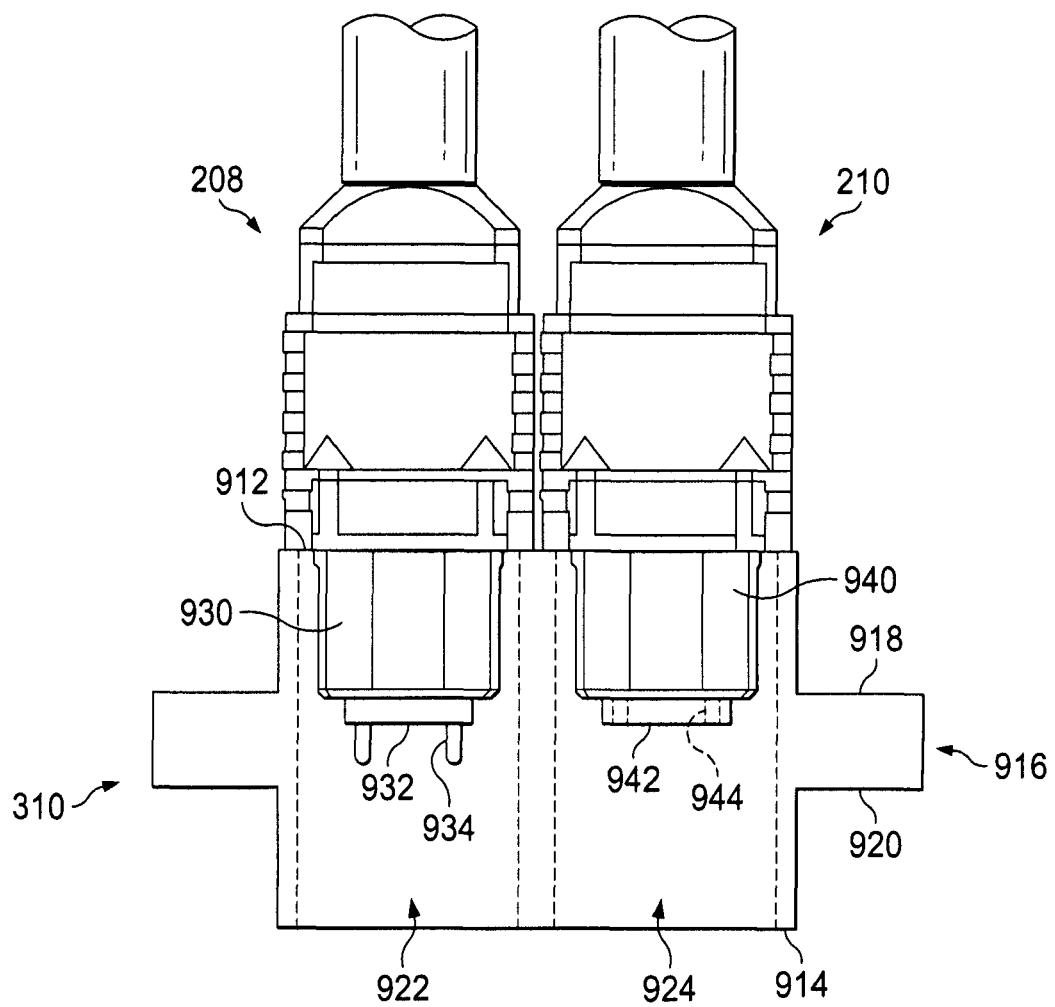
FIGS. 9A and 9B are illustrations of diagrams of an adapter and ports in accordance with an exemplary implementation of the present disclosure having a non-contact space between the ports and connector ends of subject test cables.
Figure 9B:
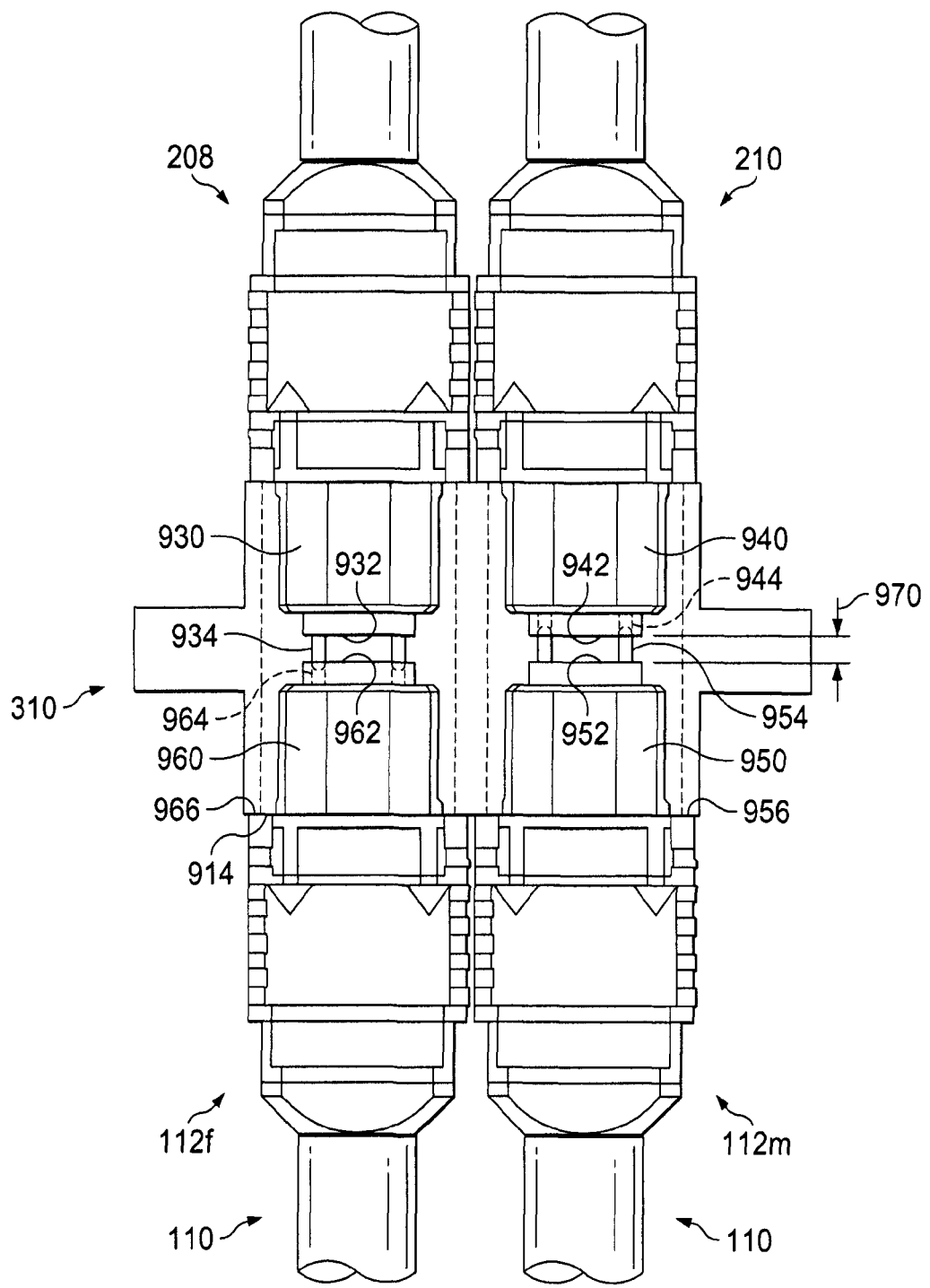

FIGS. 9A and 9B illustrate exemplary implementations of the MTP adapter 310 and connectors in greater detail. In some aspects, the MTP adapter 310 may include a first end 912, a second end 914, and a flange portion 916 disposed between the first and second ends 912, 914, respectively. The MTP adapter 310 may further include through holes 922, 924 extending from the first end 912 to the second end 914. The flange portion 916 may further include a first side 918 and a second side 920 with the first side facing the flange first end 912 and the second side 920 facing the flange second end 914. MTP adapters 310 are integrated with the signal generator output ports 116 and the sensor input port 118 of the base unit such that the second side 920 of each MTP adapter 310 is disposed proximate the front panel 106 of base unit 102 as shown in FIG. 8.

In some implementations, the signal generator output ports 116 may include one each of an MTPf signal generator output port 208 and an MTPm signal generator output port 210. The MTPf signal generator output port 208 includes a ferrule 930 having an end face 932, and guide pins 934. The individual fibers of the cable are disposed in the ferrule 930 with the fiber ends exposed in the end face 932 between the guide pins 934. The MTPm signal generator output port 210 includes a ferrule 940 having an end face 942, and holes 944. The individual fibers of the cable are disposed in the ferrule 940 with the fiber ends exposed in the end face 942 between the holes 944.

The MTPf signal generator output port 208 tests input connectors 112 of the trunk cable 110 having an MTPf connector 112f, which similar to the MTPm signal generator output port 210 includes a ferrule 960 with an end face 962, and holes 964. The MTPm signal generator output port 210 tests input connectors 112 of the trunk cable 110 having an MTPm connector 112m, which similar to the MTPf signal generator output port 208 includes a ferrule 950 with an end face 952, and guide pins 954. In the implementation shown in FIGS. 9A and 9B, the MTP adapter 310 includes an MTPf signal generator output port 208 disposed on the left hand side and an MTPm signal generator output port 210 on the right hand side; however, in other aspects, the MTPf signal generator output port 208 may be disposed on the right hand side. In further aspects, the MTP adapter 310 may include only one MTPf signal generator output port 208 or only one MTPm signal generator output port 210. In yet further aspects, the MTP adapter 310 may include more than two output ports having any combination of none, one, or more MTPf signal generator output ports 208 and none, one, or more MTPm signal generator output ports 210.

Referring now to FIG. 9B, when the MTPf connector 112f interfaces with the MTPf signal generator output port 208, a shoulder 966 of the MTPf connector 112f abuts the second end 914 of the MTP adapter 310. Similarly, when the MTPm connector 112m interfaces with the MTPm signal generator output port 210, a shoulder 956 of the MTPm connector 112m abuts the second end 914 of the MTP adapter 310. In addition, the pins 934 of the MTPf signal generator output port 208 are disposed in the holes 964 of the MTPf connector 112*f*, and the pins 954 of the MTPm connector 112*m* are disposed in the holes 944 of MTPm signal generator output port 210. The end face 932 of the MTPf signal generator output port 208 is separated from the end face 962 of the MTPf connector 112*f* by a gap 970, and the end face 942 of the MTPm signal generator output port 210 is also separated from the end face 952 of the MTPm connector 112*m* by gap 970. In some implementations, the gap 970 may be sized in the range of any non-contact gap to approximately 1.0 inch. In some implementations, the gap 970 may more preferably be 0.001 to 0.026 inch. However, other sizes of gap 970, both larger and smaller, are contemplated. While the interface of the pins 934 of the MTPf output port 208 with the holes 964 of the MTPf connector 112*f* and the interface of the pins 954 of the MTPm connector 112*m* with the holes 944 of the MTPm output port 210 maintains proper alignment of the fiber ends in the end faces 932, 942 of the MTP output ports 208, 210, respectively, to the fiber ends in the end faces 962, 952 of the MTP connectors 112*f*, 112*m*, respectively, during testing, the gap 970 protects the fibers ends by preventing contact of any part of the MTP output ports 208, 210 on the end faces of the connectors 112.

Figure 4A:
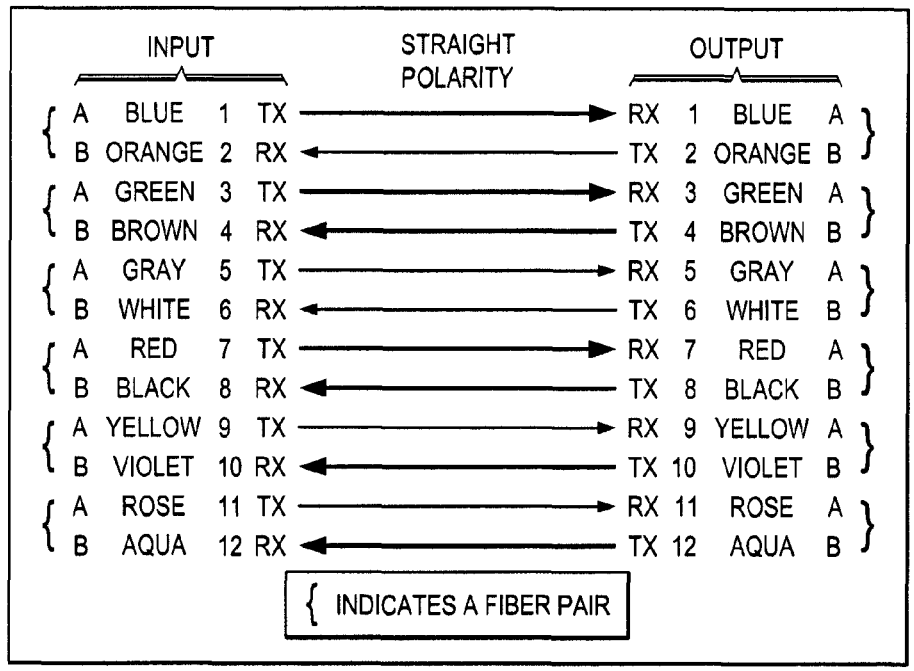
FIG. 4A is an illustration of a diagram of a straight polarity transmission protocol.
Figure 4B:
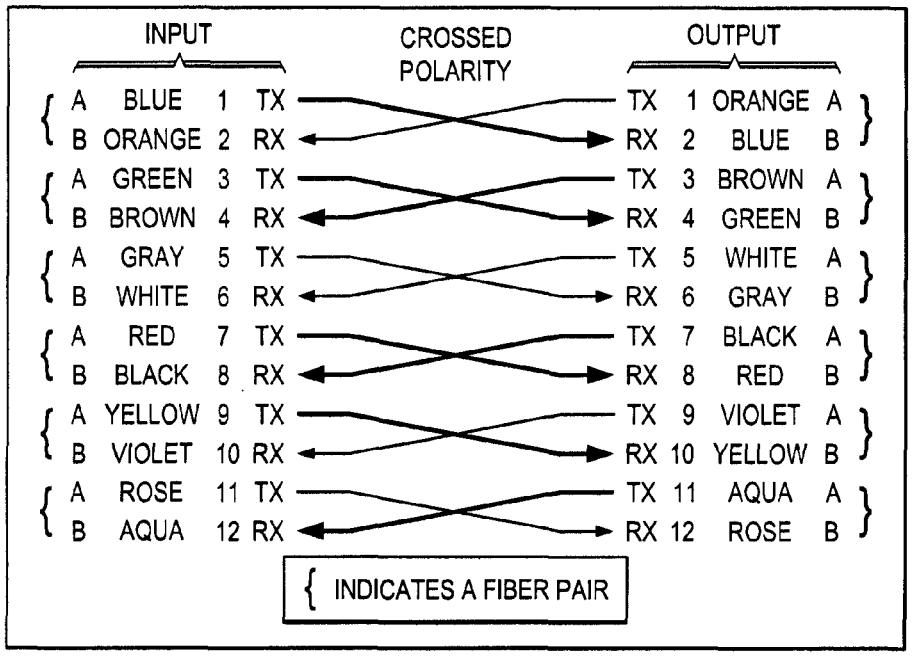
FIG. 4B is an illustration of a diagram of a crossed polarity transmission protocol.
Figure 4C:
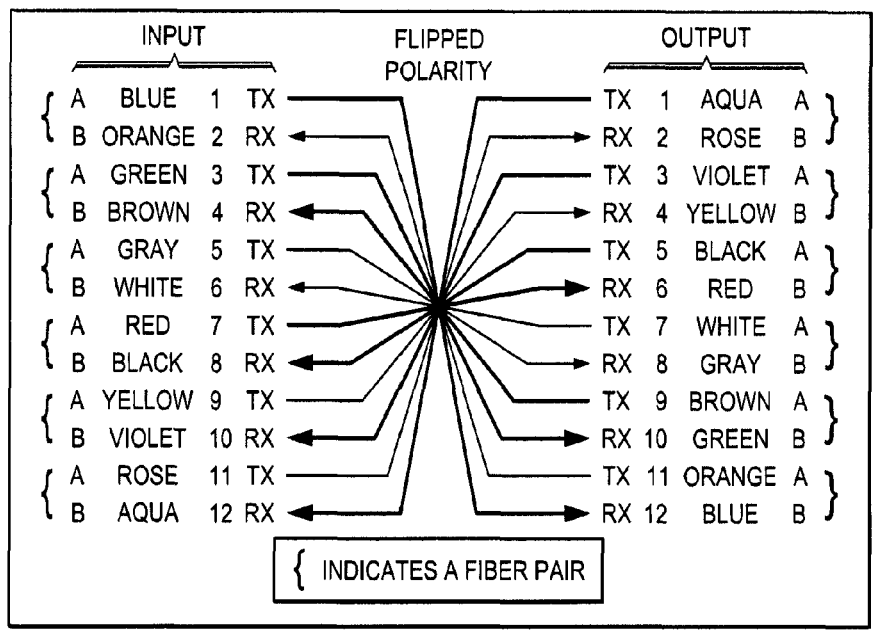
FIG. 4C is an illustration of a diagram of a flipped polarity transmission protocol.

FIGS. 4A-4C illustrate diagrams of the transmission protocols that may be tested for by the multi-path polarity tester 100. When a trunk cable 110 is manufactured, the fibers will be arranged at the input connector 112 and the output connector 114 according to one of three polarity configurations: straight polarity, flipped polarity, or crossed polarity. Straight and crossed polarity are the same regardless of whether LC or MTP connectors are used for the input connector 112. Flipped polarity has three variants. For LC input connectors, straight flipped ("A-A") or crossed flipped ("A-B") polarity may be used, while the polarity used for MTP input connectors is simply referenced as flipped polarity.

The diagrams illustrate the relationship of inputs and outputs of the trunk cable 110 for a 12-fiber cable. The numbers 1 through 12 indicate the position of each individual fiber in each connector, from left to right. For example, fiber position 1 is the leftmost position in the input connector and in the output connector, and fiber position 12 is the rightmost position in the output connector and the input connector. In an MTP connector, there are simply 12 fibers arranged in a row, while in an LC connector there are 12 LC connectors clipped together in a row.

Referring now to FIG. 4A, there is illustrated a diagram of a straight polarity transmission protocol. In this protocol, input fiber position 1 connects to output fiber position 1, input fiber position 2 connects to output fiber position 2, and so on for all 12 fibers.

Referring now to FIG. 4B, there is illustrated a diagram of a crossed polarity transmission protocol. In this protocol, each channel pair is "crossed," e.g., input fiber position 1 connects to output fiber position 2, and input fiber position 2 connects to output fiber position 1. Similarly, input fiber position 3 connects to output fiber position 4, and input fiber position 4 connects to output fiber position 3. This pattern is repeated for each channel pair.

Referring now to FIG. 4C, there is illustrated a diagram of a flipped polarity transmission protocol. In this protocol, each fiber is "mirrored" from its position on one connector to the opposite position on the other connector. That is to say, input fiber position 1 connects to output fiber position 12, input fiber position 2 connects to output fiber position 11, input fiber position 3 connects to output fiber position 10, and so on for the remaining fibers.

Figure 5:
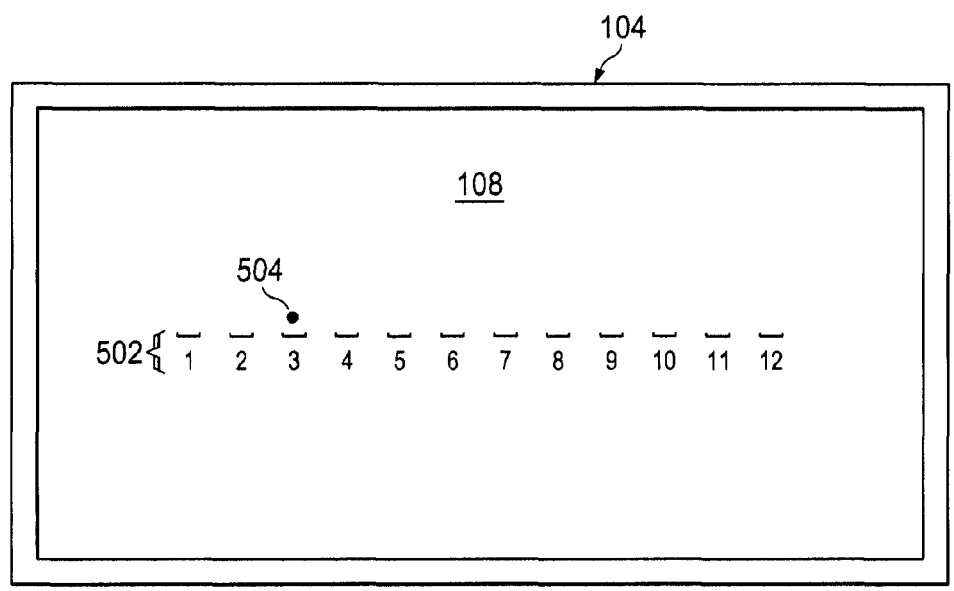
FIG. 5 is an illustration of an implementation of the display unit of the multi-path polarity tester during operation of the multi-path polarity tester.

Referring now to FIG. 5, there is illustrated an implementation of display unit 104 during operation of the multi-path polarity tester 100. In this implementation, the display 108 directly displays an image as seen by the light sensor 306. As described above, the light sensor 306 may be a camera which views the light exiting the output connector 114 via the sensor input port 118. In this implementation, the output connector 114 is a 12-fiber MTP connector, and accordingly the display shows a view of the end of the 12-fiber MTP output connector 114. An array of 12 brackets 502 is superimposed over the light sensor image on the display 108. It should be understood that the number of brackets corresponds to the number of fibers, and may vary depending on the setting of the path selection control or the connector selection. Each of the brackets is placed such that it brackets or identifies the location of a fiber in the MTP output connector 114. Each bracket is numbered from left to right, which allows a user to easily identify the fiber position that is lit up when light is sent through the corresponding fiber of the trunk cable 110. For example, light spot 504 is in fiber position 3 of the MTP output connector 114. The other positions and fibers positions are also aligned. Since the brackets each align with a single fiber, the polarity tester 100 may test the polarity of the fibers by directing light through individual fibers, and the light spot will then appear at the corresponding bracket for each fiber.

Figure 6:
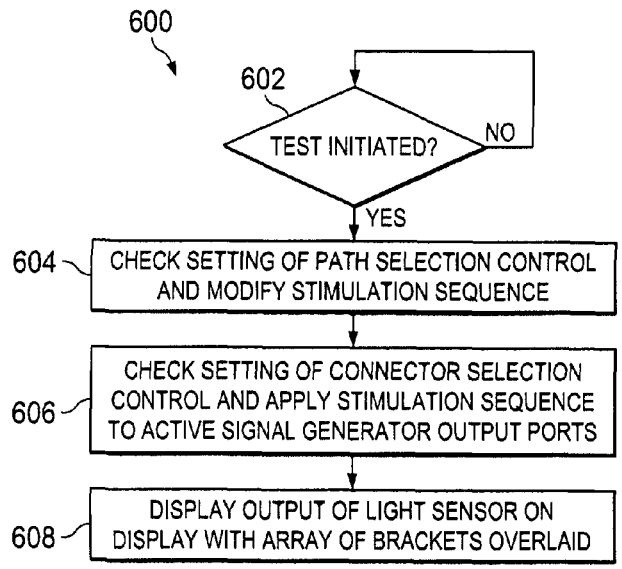
FIG. 6 is an illustration of a block diagram of a method for testing the transmission polarity of a fiber optic trunk cable from the perspective of the processor.

FIG. 6 illustrates a flow chart diagram of a method 600 for testing the transmission polarity of a fiber optic trunk cable 110 using the multi-path polarity tester 100 from the perspective of the processor 308. Beginning at block 602, the processor 308 monitors the test initiation control 218. When the test initiation control 218 is actuated, the test begins. Accordingly, the test initiation control may communicate a signal to the processor 308, which may then initiate the test sequence. For example the test initiation control may be actuated by a user pressing a button, flipping a switch or taking other action. In some implementations, the test initiation control cooperates with the signal generator output port 116 so that the test initiation begins whenever the input connector 112 is introduced to the signal generator output port 116. When the test is initiated, the method moves to block 604.

At block 604, the processor 308 checks the setting of the path selection control 204 and, based on the setting, selects or modifies a stimulation sequence to be used to stimulate the fiber optic trunk cable 110. In order to remove the need for a user to keep track of what the expected response to a simple 1 to 12 stimulation sequence should be based on each possible transmission protocol, the processor 308 selects or modifies the stimulation sequence such that the expected response sequence will be a simple 1 to 12 sequence regardless of the actual stimulation sequence. In other implementations, the processor 308 may retrieve a pre-determined stimulation sequence from memory based on the setting of the path selection control 204. The processor or other electronics of the polarity tester 100 may activate an active a path selection indicator 206 to indicate to the user the selected path.

At block 606, the processor 308 checks the setting of the connector selection control 214 to determine which of the signal generator output ports 116 should receive the stimulation, and the processor will then direct the light source to the proper signal generator output port. The selected signal generator output ports may also be indicated by an LED. The processor 308 then activates the light sources 302 in the stimulation sequence determined at block 604, and directs the light to the selected signal generator output ports 116.

For example, the processor may control the stimulation sequence for the straight polarity sequence to be 1, 2, 3, 4, 5, 6, 7, 8, 9, 10, 11, 12; the stimulation sequence for the flipped polarity sequence may be 12, 11, 10, 9, 8, 7, 6, 5, 4, 3, 2, 1; and the stimulation sequence for the crossed polarity sequence may be 2, 1, 4, 3, 6, 5, 8, 7, 10, 9, 12, 11. Other sequences for other types of fibers are contemplated herein, and may vary with the number of fibers in the trunk cable 110 and the connector types.

Each fiber of the trunk cable 110 is stimulated in sequence, and may be stimulated for an amount of time that makes it easy for a user to verify stimulation at block 608. In some implementations, this amount of time is one second. In other implementations, the amount of time is longer or shorter than one second. In some implementations, the amount of time is less than 5 seconds. In some implementations, the length of stimulation time for each fiber may be variable and may be selected or input by a user based on a personal preference or other criteria.

At block 608, the processor 308 passes the output of the light sensor 306 to the display 108 and overlays the array of brackets 502 on the display 108, thereby showing the results of the test. The output of the light sensor 306 is the response to the stimulation sequence. If the path selection control 204 and the connector selection control 214 are set properly, and if the fiber optic trunk cable 110 is manufactured properly, then light spots 504 will display in sequence from the leftmost bracket 502 (which is labeled with a "1") to the rightmost bracket 502 (which is labeled with a "12"). In some implementations, the light spots for a proper fiber will display in sequence adjacent each bracket as 1, 2, 3, 4, 5, 6, 7, 8, 9, 10, 11, 12, regardless of whether the stimulation sequence is the straight polarity sequence, the flipped polarity sequence, the crossed polarity sequence or some other sequence. As such, if the test results vary from the expected sequence of 1, 2, 3, 4, 5, 6, 7, 8, 9, 10, 11, 12, it is indicative of a faulty cable.

Figure 7:
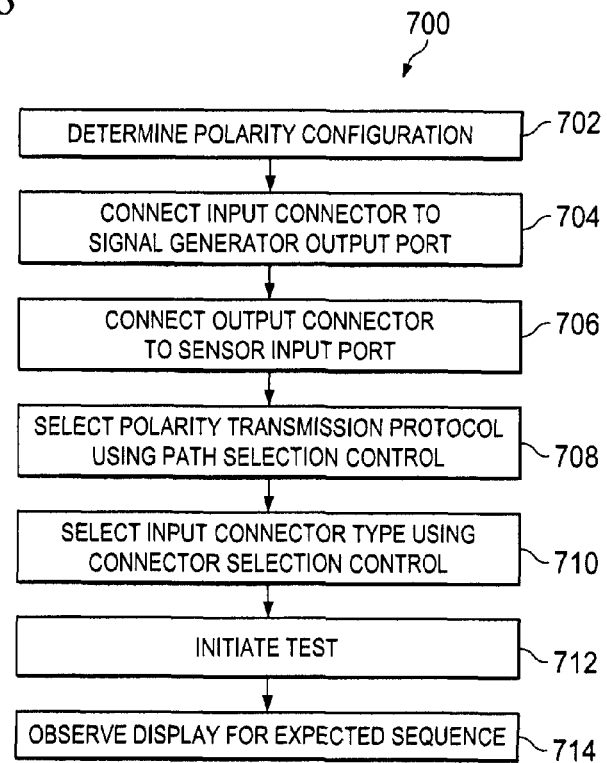
FIG. 7 is an illustration of a block diagram of a method for testing the transmission polarity of a fiber optic trunk cable using the multi-path polarity tester from the perspective of a user.

Referring now to FIG. 7, there is illustrated a flow chart diagram of a method 700 for testing the transmission polarity of a fiber optic trunk cable 110 using the multi-path polarity tester 100 from the perspective of a user. Beginning at block 702, the user determines the polarity configuration of the fiber optic trunk cable 110 that is to be tested. For example, the user may determine the polarity configuration as straight, flipped, crossed, as described herein, or some other polarity configuration.

At block 704, the user connects the input connector 112 of the trunk cable 110 to the appropriate signal generator output ports 116 on the front panel 106 of the multi-path polarity tester 100. At block 706, the user connects the output connector 114 of the trunk cable 110 to the sensor input port 118 on the front panel 106 of the polarity tester 100.

At block 708, the user manipulates the path selection control 204 to select the polarity transmission protocol that corresponds to the polarity configuration of the trunk cable 110 that was determined at block 702. For example, the user may select the polarity configuration as straight, flipped, crossed, as described herein, or some other polarity configuration. In some implementations, this may be done by manually activating a user input device, such as a selection knob, switch, button, or other input device.

At block 710, the user manipulates the connector selection control 214 to select the signal generator output ports 116 to which the user connected the trunk cable 110 at block 704. For example, the user may select the active signal generator output port set from among the MTPf signal generator output port 208, the MTPm signal generator output port 210, and the LC pair signal generator output ports 212. The polarity tester 100 may respond by activating an active connector indicator 216 associated with each set of output ports to indicate to the user which ports are presently selected, and therefore which ports to plug the trunk cable 110's input connectors 112 into for testing. In some implementations, this may be done by manually activating a user input device, such as a selection knob, switch, button, or other input device.

At block 712, the user actuates the test initiation control 218, beginning the test. As described herein, this may be done by pressing a button, flipping a switch, or performing some other action to initiate the test.

At block 714, the user observes the display 108 to see if the expected response is displayed. As noted above with respect to block 608, if the user set the path selection control 204 and the connector selection control 214 properly, and if the fiber optic trunk cable 110 was manufactured properly, then the user should observe light spots 504 in sequence from the leftmost bracket 502 (which is labeled with a "1") to the rightmost bracket 502 (which is labeled with a "12").

If the light spots shine in sequence from 1 to 12, then the cable has passed the polarity test and the polarity of the cable is correct. If the light spots do not light in sequence from 1 to 12, and so long as the settings are correct, then the cable does not pass the polarity test, and the cable can be repaired or discarded. Thus, the polarity test allows a user to test the polarity of cables in a manner simpler and easier than has been done before. That is, the cable polarity can be tested in a simple manner, increasing the accuracy and efficiency of polarity testing.

Various implementations of the present disclosure may include advantages over prior solutions. Conventional testing arrangements involve a user observing, possibly with the naked eye, a response to a uniform stimulus that is applied to a fiber optic trunk cable and relying on their knowledge of the expected response for each polarity configuration. By contrast, the present system does away with the need to remember different response sequences, thereby reducing potential mistakes by the user, and also provides an easy-to-view magnified display to reduce strain on the user's eyes. Furthermore, conventional testing arrangements may require connectors of the cable under test to be inserted such that the ferrules of the connectors are in contact with the testing equipment. This causes wear and tear on the delicate ferrules. By contrast, the present system uses adapters to align the ferrules of the connectors with the signal source and with the light sensor input to create an optical interface without putting wear and tear on the ferrules.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus for testing a polarity of a fiber optic cable, comprising:
    a plurality of signal generator ports configured to connect to a first end of the fiber optic cable;
    a plurality of test signal generators disposed to cooperate with the plurality of signal generator ports;
    a sensor input port configured to connect to a second end of the fiber optic cable;
    a sensor disposed to cooperate with the sensor input port and configured to receive a test signal from the sensor input port;
    a first selector switch operable by a user to select a test sequence of a plurality of different test sequences; and
    a processor operable to stimulate the plurality of test signal generators to produce a test signal in a first sequence based on the selected test sequence, the processor further operable to output results of the test sequence to a user;
    wherein the processor directs the test signal to at least one signal generator port in optical communication with a plurality of optical fibers in the first end of the fiber optic cable based on the selected test sequence.

2. The apparatus of claim 1, further comprising a display in communication with the processor and arranged to receive the results output from the processor and display the results to the user.

3. The apparatus of claim 2, wherein:
    the results output from the processor to the display is a second sequence different from the first sequence, and
    the second sequence is the same for any of the plurality of different test sequences.

4. The apparatus of claim 1, wherein:
    the results output from the processor to a display indicate that the sensor sensed the signal in an expected sequence related to the first sequence.

5. The apparatus of claim 4, wherein:
    the expected sequence is a function of a cable through which the signal is passed.

6. The apparatus of claim 1, wherein:
    the sensor is a light sensor, and
    the signal generator is a light source.

7. The apparatus of claim 1, wherein:
    the sensor is a camera, and
    the output of a display represents the output of the camera.

8. The apparatus of claim 1, wherein:
    the first selector switch selects from one of five transmission protocols, and
    the first sequence is based on the selected one of the five transmission protocols.

9. The apparatus of claim 1, further comprising a second selector switch, and wherein:
    the signal generator ports are comprised of multi-termination push-on (MTP) female connectors, MTP male connectors, and lucent connectors (LC),
    the sensor input port is an MTP female connector, and
    a position of the second selector switch selects one of the MTP female connectors, the MTP male connectors, or the LC to be stimulated.

10. The apparatus of claim 1, wherein:
    the sensor input port and the signal generator ports include guide pins that slot into holes in the fiber optic cable to align the sensor input port and the signal generator ports with ferrules of optical fibers in the fiber optic cable such that the sensor input port and the signal generator ports are in optical communication with the optical fibers.

11. The apparatus of claim 1, further comprising:
    a memory containing a plurality of pre-determined first sequences, the processor further operable to retrieve the pre-determined first sequences based on a position setting of the first selector switch.

12. The apparatus of claim 1, wherein:
    the processor is further operable to create the first sequence based on a position setting of the first selector switch.

13. An apparatus for testing a polarity of a fiber optic cable, comprising:
    a plurality of signal generator ports configured to connect to a first end of the fiber optic cable;
    a plurality of test signal generators disposed to cooperate with the plurality of signal generator ports;
    a sensor input port configured to connect to a second end of the fiber optic cable;
    a sensor disposed to cooperate with the sensor input port and configured to receive a test signal from the sensor input port;
    a first selector switch operable by a user to select a test sequence of a plurality of different test sequences; and
    a processor operable to stimulate the plurality of test signal generators to produce a test signal in a first sequence based on the selected test sequence, the processor further operable to output results of the test sequence to a user;
    wherein the sensor input port and the signal generator ports include guide pins that slot into holes in the fiber optic cable to align the sensor input port and the signal generator ports with ferrules of optical fibers in the fiber optic cable such that the sensor input port and the signal generator ports are in optical communication with the optical fibers.

14. The apparatus of claim 13, further comprising a display in communication with the processor and arranged to receive the results output from the processor and display the results to the user.

15. An apparatus for testing a polarity of a fiber optic cable, comprising:
    a plurality of signal generator ports configured to connect to a first end of the fiber optic cable;
    a plurality of test signal generators disposed to cooperate with the plurality of signal generator ports;
    a sensor input port configured to connect to a second end of the fiber optic cable;
    a sensor disposed to cooperate with the sensor input port and configured to receive a test signal from the sensor input port;
    a first selector switch operable by a user to select a test sequence of a plurality of different test sequences; and
    a processor operable to stimulate the plurality of test signal generators to produce a test signal in a first sequence based on the selected test sequence, the processor further operable to output results of the test sequence to a user;

a memory containing a plurality of pre-determined first sequences, the processor further operable to retrieve the pre-determined first sequences based on a position setting of the first selector switch.

16. The apparatus of claim 15, further comprising a display in communication with the processor and arranged to receive the results output from the processor and display the results to the user.

17. An apparatus for testing a polarity of a fiber optic cable, comprising:
- a plurality of signal generator ports configured to connect to a first end of the fiber optic cable;
- a plurality of test signal generators disposed to cooperate with the plurality of signal generator ports;
- a sensor input port configured to connect to a second end of the fiber optic cable;
- a sensor disposed to cooperate with the sensor input port and configured to receive a test signal from the sensor input port;
- a first selector switch operable by a user to select a test sequence of a plurality of different test sequences; and
- a processor operable to stimulate the plurality of test signal generators to produce a test signal in a first sequence based on the selected test sequence, the processor further operable to output results of the test sequence to a user;

wherein the processor is further operable to create the first sequence based on a position setting of the first selector switch.

18. The apparatus of claim 17, further comprising a display in communication with the processor and arranged to receive the results output from the processor and display the results to the user.

19. The apparatus of claim 18, wherein:
the results output from the processor to the display is a second sequence different from the first sequence, and
the second sequence is the same for any of the plurality of different test sequences.

20. The apparatus of claim 17, wherein:
the results output from the processor to a display indicate that the sensor sensed the signal in an expected sequence related to the first sequence.

* * * * *